(12) United States Patent
Sugiyama

(10) Patent No.: US 6,219,103 B1
(45) Date of Patent: Apr. 17, 2001

(54) MOTION-COMPENSATED PREDICTIVE CODING WITH VIDEO FORMAT CONVERSION

(75) Inventor: Kenji Sugiyama, Yokosuka (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/256,219

(22) Filed: Feb. 24, 1999

(30) Foreign Application Priority Data

Feb. 25, 1998 (JP) .................................................. 10-060473

(51) Int. Cl.[7] .................................................. H04N 7/01
(52) U.S. Cl. .................. 348/452; 348/416.1; 348/431.1
(58) Field of Search .................................. 348/448, 452, 348/458, 426.1, 240.12, 240.16, 240.13, 416.1

(56) References Cited

U.S. PATENT DOCUMENTS

| | | | |
|---|---|---|---|
| 5,134,480 | * 7/1992 | Wang et al. | 358/140 |
| 5,177,610 | * 1/1993 | Wilkinson | 348/452 |
| 5,430,490 | * 7/1995 | Rim | 348/452 |
| 5,450,133 | * 9/1995 | Herpel et al. | 348/452 |
| 5,619,272 | * 4/1997 | Salmon et al. | 348/452 |
| 5,784,114 | * 7/1998 | Burer et al. | 348/452 |

FOREIGN PATENT DOCUMENTS 10-126786   5/1998   (JP) .

* cited by examiner

*Primary Examiner*—Victor R. Kostak
(74) *Attorney, Agent, or Firm*—Jacobsob, Price, Holman & Stern, PLLC

(57) ABSTRACT

An input first video signal is converted by video format conversion into a second video signal to be encoded. The number of effective scanning lines of the second video signal is different from the number of effective scanning lines of the first video signal. The first video signal is further converted into a third video signal for which spatial aliasing noise is suppressed. The motion of each picture carried by the third video signal is estimated to obtain first motion vector data. The motion of the second video signal is searched using the first motion vector data to obtain second motion vector data. The second video signal is then encoded by motion-compensated prediction using the second motion vector data.

4 Claims, 2 Drawing Sheets

MOTION-COMPENSATED PREDICTIVE CODING WITH VIDEO FORMAT CONVERSION

BACKGROUND OF THE INVENTION

The present invention relates to highly efficient coding of video data to digital signals with a small amount of codes for efficient data transfer, storage and displaying. Particularly, this invention relates to motion-compensated coding of video data.

Moving picture highly efficient coding in MPEG standards includes motion-compensated prediction. Motion-compensated prediction of interlaced video signals produces relatively many predictive errors due to many spatial aliasing noise components generated in each field of the interlaced videos.

Compared to interlaced video signals, motion-compensated prediction of progressive video signals produces a small amount of predictive errors because of spatial aliasing noise components included in the progressive signals, that are fewer than those in interlaced video signals.

Encoding after interlaced video signals have once been converted into progressive signals thus produces an amount of codes smaller than those produced by encoding of interlaced video signals themselves.

Encoding after video format conversion (interlaced to progressive signals) requires motion vector prediction using video signals to be encoded. Video signals produced by video format conversion exhibits a slight displacement between the original scanning lines and scanning lines produced by interpolation, and contamination of scanning lines produced due to erroneous interpolation, etc. The video signals produced by video format conversion have no problem on subjective picture quality, however, exhibits difficulty in motion vector detection.

SUMMARY OF THE INVENTION

A purpose of the present invention is to provide an apparatus and a method of motion-compensated predictive coding of video signals that have been obtained by video format conversion of input video signals, achieving high coding efficiency and picture quality.

The present invention provides a coding apparatus. The coding apparatus has a first converter to convert an input first video signal into a second video signal to be encoded, the number of effective scanning lines of the second video signal being different from the number of effective scanning lines of the first video signal; and a second converter to convert the first video signal into a third video signal for which spatial aliasing noise is suppressed. The coding apparatus also includes a motion estimator to estimate motion of pictures carried by the third video signal to obtain first motion vector data; and a vector searcher to search motion of the second video signal using the first motion vector data to obtain second motion vector data. The coding apparatus further includes an encoder to encode the second video signal by motion-compensated prediction using the second motion vector data.

Furthermore, the present invention provides a coding method. An input first video signal is converted into a second video signal to be encoded, the number of effective scanning lines of the second video signal being different from the number of effective scanning lines of the first video signal. The first video signal is converted into a third video signal for which spatial aliasing noise is suppressed. The motion of each picture carried by the third video signal is estimated to obtain first motion vector data. The motion of the second video signal is searched using the first motion vector data to obtain second motion vector data. The second video signal is encoded by motion-compensated prediction using the second motion vector data.

DETAILED DESCRIPTION OF PREFERRED EMBODIMENTS

A preferred embodiment according to the present invention will be described with reference to the attached drawings.

Figure 1:
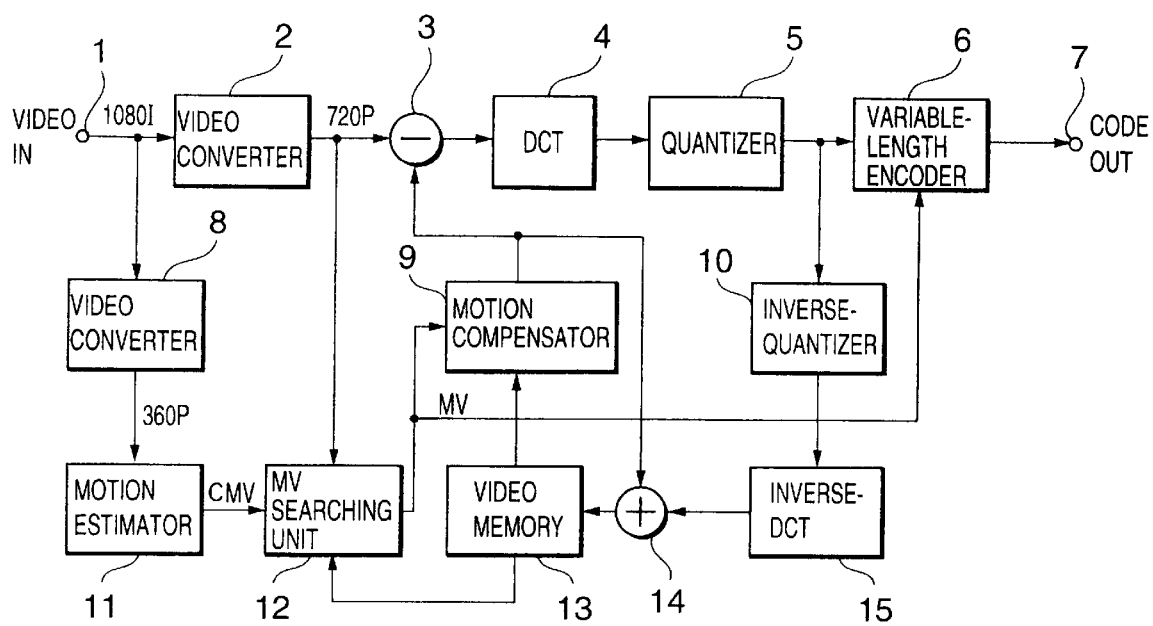
FIG. 1 shows a block diagram of a preferred embodiment of a coding apparatus according to the present invention.

Shown in FIG. 1 is a block diagram of a preferred embodiment of a coding apparatus according to the present invention.

An input interlaced video signal (1080I) having 1080 effective scanning lines is supplied to video converters 2 and 8 via an input terminal 1. The interlaced video signal is converted by the converter 2 into a progressive signal (720P) having 720 effective scanning lines for each of 60 frames per second (the first video format conversion). In detail, the input video signal is once converted into a progressive video signal having 1080 effective scanning lines by interpolation with scanning lines that have been decimated during interlacing.

The 1080 effective scanning lines of the progressive signal are then decimated to 720 lines by scanning line conversion processing. The scanning lines for interpolation are produced from the fields before and after the current picture or from the upper and lower scanning lines on the current picture. The number of pixels of the progressive signal (720P) in the horizontal direction is 1280.

The converted progressive video signal (720P) is supplied to a subtractor 3. Also supplied to the subtractor 3 is an inter-image predictive signal from a motion compensator 9. The inter-image predictive signal is subtracted from the progressive video signal (720P) to produce a predictive error signal.

The predictive error signal is supplied to a discrete cosign transformer (DCT) 4 and transformed into DCT coefficients. The DCT coefficients are supplied to a quantizer 5 that quantizes the DCT coefficients at a predetermined stepsize to generate fixed-length code of the predictive error signal. The generated fixed-length code is supplied to a variable-length encoder 6 and an inverse-quantizer 10.

The variable-length encoder 6 encodes the fixed-length code of the predictive error signal to a variable-length code. The encoder 6 also encodes main motion vectors (MMVs) supplied from an MV searching unit 12 to another variable-length code. Bit streams of the variable-length codes are multiplexed and output through an output terminal 7.

The fixed-length code supplied to the inverse-quantizer 10 is processed and supplied to an inverse-DCT 15 that reproduces the predictive error signal. The operations of the inverse-quantizer 10 and the inverse-DCT 15 and the inverse of the quantizer 5 and the DCT 4. The reproduced predictive error signal is supplied to an adder 14. The adder 14 adds the predictive error signal and a predictive signal supplied from a motion compensator 9 to reproduce the progressive video signal (720P).

The reproduced video signal (720P) is stored in a video memory 13. The stored video signal is supplied to the motion compensator 9. The compensator 9 processes the video signal by motion compensation using the resultant motion vectors MVs supplied from the MV searching unit 12 to generate an inter-image predictive signal that is then supplied to the subtractor 3 and the adder 14.

The input interlaced video signal (1080I) having 1080 effective scanning lines and being supplied to the video converter 8 is converted into a progressive signal (360P) to be used only for motion estimation and having 360 effective scanning lines (the second video format conversion).

The number of the effective scanning lines of the progressive signal (360P) is one-half of that of the other progressive signal (720P). In other words, the number of effective scanning lines of a progressive signal to be coded and obtained by the first video format conversion is preferably an integral number times that of a progressive signal to be used for motion estimation and obtained by the second video format conversion.

In detail, the video signal conversion from the interlaced video signal (1080I) to the progressive signal (360P) is carried out by converting 540 effective scanning lines for each field of the interlaced video signal into 360 lines. Furthermore, the interlaced video signal having 60 fields per second is converted into the progressive signal having 60 frames per second, the number of pixels in the horizontal direction being converted into 640.

The bandwidth of the interlaced video signal (1080I) is limited by a low-pass filter (not shown) of the video transformer 8 during the video signal conversion to completely suppress the spatial aliasing noise components carried by the input interlaced video signal. In the embodiment, the spatial aliasing noise components of frequencies higher than 360 TV lines are suppressed for video format conversion to a progressive signal having 360 effective scanning lines.

Figure 2A:
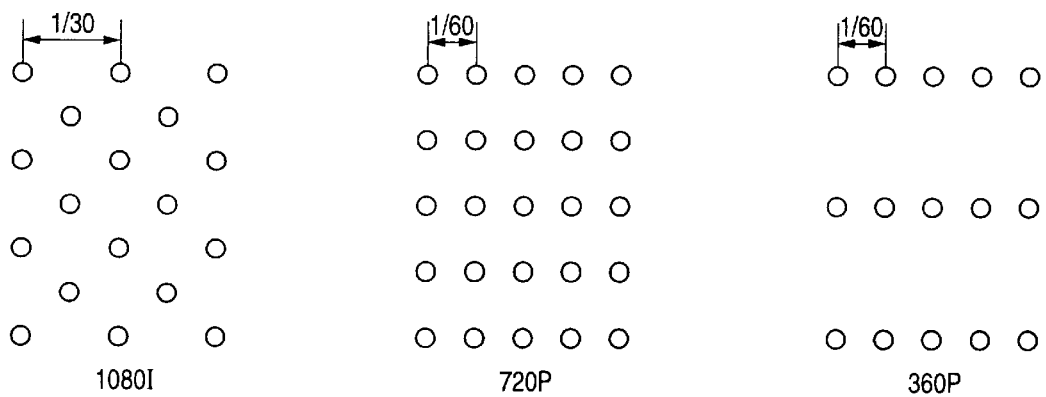
FIG. 2A illustrates effective scanning lines of the interlaced video signal (1080I) and the progressive video signals (720P and 360P)
Figure 2B:
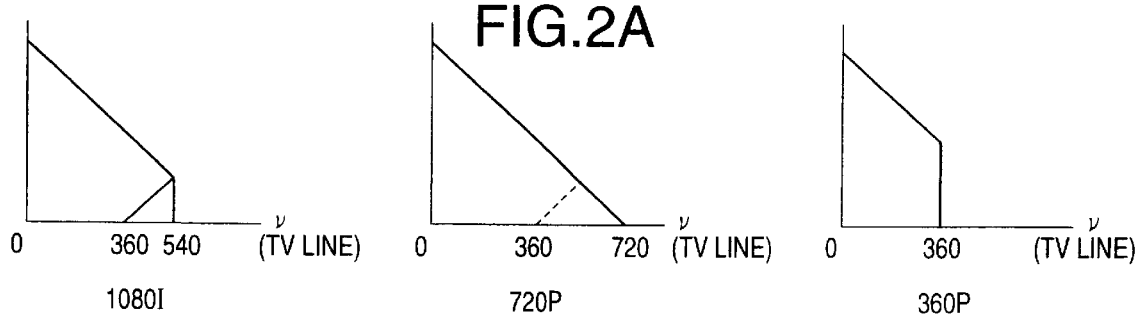
FIG. 2B illustrates frequency spectra of the interlaced signal (1080I) and the progressive signals (720P and 360P)

Illustrated in FIG. 2A and FIG. 2B are the effective scanning lines and the vertical frequency spectra (v), respectively, of the interlaced signal (1080I) and the progressive signals (720P and 360P).

As shown, each field of the input interlaced video signal (1080I) having 1080 effective scanning lines exhibits spatial aliasing noise components at 360 TV lines or more. These noise components vary without respect to the movement of picture, and hence they would degrade the correctness of motion vector detection and inter-image motion prediction.

On the other hand, such spatial aliasing noise components are relatively suppressed for the progressive signal (720P) having 720 effective scanning lines as the video signal to be coded, thus the inter-image predictive error being made less. Nevertheless, minute displacement would occur between the pictures carried by the input interlaced video signal (1080I) and the pictures carried by the signal for scanning line interpolation due to motion compensation that is carried out during the interpolation by the video converter 2.

Furthermore, the signal for scanning line interpolation would include interpolation error components due to imperfection of the interpolation. The progressive signal (720P) can be coded with no visual problems, however, exact motion of the signal (720P) cannot be detected for motion vector detection due to the existence of the interpolation error components.

The progressive signal (360P) having 360 effective scanning lines to be used for motion estimation cannot be used as a video signal to be coded due to its low resolution. Exact motion of the picture carried by the signal (360P) can, however, be detected by motion vector estimation with pattern matching because of no spatial aliasing noise components and no degradation due to interpolation as shown in FIGS. 2A and 2B.

The progressive signal (360P) is supplied from the video converter 8 to a motion estimator 11 as shown in FIG. 1 to obtain coarse motion vectors CMVs between frames that undergo interframe prediction. Each coarse motion vector is obtained for an 8×8 block of pixels at one pixel precision.

The number of pixels of the progressive signal (360P) only for motion estimation is one-half of that of the other progressive signal (720P) to be coded in both the horizontal and vertical directions. Hence, the coarse motion vector CMV obtained for one 8×8 block of pixels at one pixel precision is applied to one 16×16 block of pixels at two pixel precision for the progressive signal (720P) to be coded. The motion estimation is carried out by pattern matching using the 8×8 block of reference pixels. The number of the reference pixels is relatively small, so that, not only the center block, but the neighbouring blocks may be used for the pattern matching.

The coarse motion vectors CMVs are supplied to the MV searching unit 12 as shown in FIG. 1. The unit 12 obtains the resultant motion vectors MVs between the progressive signal (720P) to be coded supplied from the video converter 2 and the reproduced progressive signal also having 720 effective scanning lines and supplied from the video memory 13 by using the coarse motion vectors CMVs. The motion vector searching is carried out around the coarse motion vectors CMVs in the range of ± one pixel in the horizontal and vertical directions at one pixel precision. The obtained resulltant motion vectors MVs are supplied to the variable-length encoder 6 and the motion compensator 9.

Figures 3A, 3B:
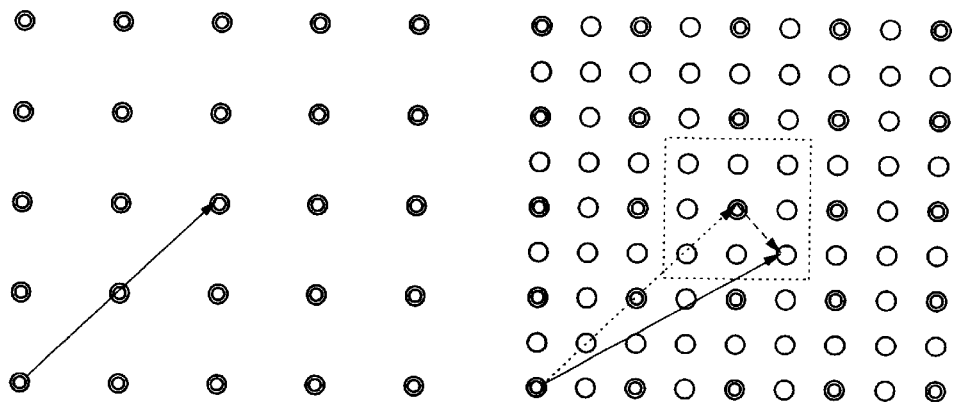
FIGS. 3A and 3B explain the search for the motion vectors by the motion estimator and the MV searching unit shown in FIG.1, respectively.

Explained in FIGS. 3A and 3B are the search for the motion vectors CMV and MV, respectively. In these drawings, the signs "⊙" represent pixels that exist in the progressive signal (360P) only for motion estimation, and the signs "○" represent pixels that exist only in the progressive signal (720P) to be coded. The dot line arrow represents the auxiliary motion vector CMV obtained by the motion estimator 11. On the other hand, the solid line arrow represents the resultant motion vector MV obtained by the MV searching unit 12. The dot line square represents the area for searching the resultant motion vector MV.

The resultant motion vector of 0.5 pixel accuracy can be obtained by the MV searching unit 12 that carries out the search around a motion vector of one pixel accuracy based on a motion vector of one pixel accuracy obtained by the MV searching unit 12 in the range of ±0.5 pixel in the horizontal and vertical directions at 0.5 pixel accuracy.

The resultant motion vectors MVs obtained as disclosed above are suitable for coding the progressive video signal (720P). Because a broad movement of a picture is first detected by using the coarse motion vectors CMVs, and then accurate resultant motion vectors MVs are obtained for the progressive video signal (720P) to be actually coded.

Figure 4:
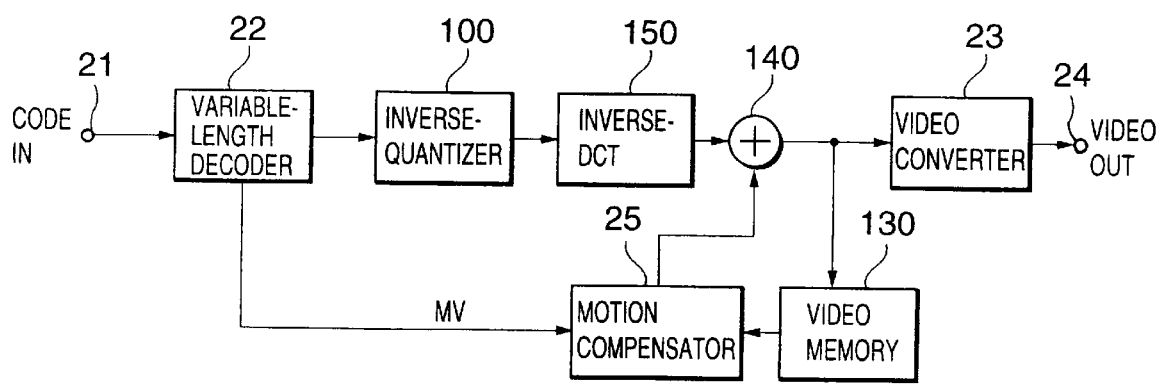
FIG. 4 shows a block diagram of a decoding apparatus that is suitable for decoding a video signal coded by the coding apparatus shown in FIG. 1.

The bit streams of the variable-length codes output via the output terminal 7 (FIG. 1) are, for example, supplied to a decoding apparatus as shown in FIG. 4.

The bit streams of the variable-length codes obtained by the motion-compensated predictive coding as described above are supplied to a variable-length decoder 22 via an input terminal 21. The decoder 22 converts the bit streams of the predictive error and the resultant motion vector MV into the 8×8 block DCT coefficients of fixed-length codes.

The DCT coefficients are supplied to an inverse-quantizer 100. The de-quantized coefficients are supplied to an inverse-DCT 150 that transforms the 8×8 block coefficients to reproduce the inter-image predictive error signal. The reproduced signal is supplied to an adder 140. The adder 140 adds the inter-image predictive error signal and an inter-image predictive signal supplied from a motion compensator 25 to reproduce the progressive video signal having 720 effective scanning lines. The reproduced video signal is supplied to a video memory 130 and a video converter 23.

The video converter 23 converts the progressive video signal having 720 effective scanning lines into an interlaced video signal having 1080 effective scanning lines. The interlaced video signal is output via an output terminal 24.

The reproduced video signal that has been supplied to and stored in the video memory 130 is supplied to the motion compensator 25. The reproduced video signal is motion-compensated by the motion compensator 25 by using the resultant motion vectors MVs supplied from the variable-length decoder 22 to produce an inter-image predictive signal that is supplied to the adder 140.

As described above, according to the present invention, pictures (progressive signal 360P) are formed with no spatial ailiasing noise components by video format conversion of input pictures (interlaced signal 1080I). The pictures (progressive signal 360P) are used only for motion estimation to obtain coarse motion vectors. Resultant motion vectors of pictures (progressive signal 720P) to be coded that are formed by video format conversion of the input pictures are then obtained by using the coarse motion vectors.

The present invention achieves accurate prediction of motion of actual pictures. Because the pictures (progressive signal 360P) to be used only for motion estimation are pictures with no spatial aliasing noise components that have been included in the input pictures. Furthermore, the pictures (progressive signal 360P) are not subjected to any degradation due to interpolation.

Furthermore, according to the present invention, resultant motion vectors of pictures (progressive signal 720P) to be coded are obtained for achieving few pattern matching errors and detection of broad movement of the pictures to be coded. The resultant motion vectors correspond to actual movement of the pictures to be coded. The resultant motion vectors have less unnecessary variation, thus having a small amount of motion vector data.

Coded pictures (progressive signal 720P) exhibit natural movement for viewers. Because the present invention achieves less degradation of picture quality for such coded pictures even if some predictive errors remain due to quantization of large stepsize. The present invention thus further achieves high quality of pictures that are obtained by decoding the coded pictures while decreasing the amount of codes.

Furthermore, according to the present invention, the number of the effective scanning lines of the video signal to be coded that is obtained by the first video format conversion is an integral number times the number of effective scanning lines of the video signal to be used for motion estimation that is obtained by the second video format conversion.

This scanning line number adjustment makes blocks for motion estimation and other blocks for resultant motion vector search match each other, thus the resultant motion vectors that correspond to actual movement can be obtained.

What is claimed is:

1. A coding apparatus comprising:

a first converter to convert an input first video signal into a second video signal to be encoded, the number of effective scanning lines of the second video signal being different from the number of effective scanning lines of the first video signal;

a second converter to convert the first video signal into a third video signal for which spatial aliasing noise is suppressed;

a motion estimator to estimate motion of pictures carried by the third video signal to obtain first motion vector data;

a vector searcher to search motion of the second video signal using the first motion vector data to obtain second motion vector data; and an encoder to encode the second video signal by motion-compensated prediction using the second motion vector data.

2. The coding apparatus according to claim 1, wherein the number of the effective scanning lines of the second video signal is an integral number times the number of effective scanning lines of the third video signal.

3. A coding method comprising the steps of:

converting an input first video signal into a second video signal to be encoded, the number of effective scanning lines of the second video signal being different from the number of effective scanning lines of the first video signal;

converting the first video signal into a third video signal for which spatial aliasing noise is suppressed;

estimating motion of pictures carried by the third video signal to obtain first motion vector data;

searching motion of the second video signal using the first motion vector data to obtain second motion vector data; and encoding the second video signal by motion-compensated prediction using the second motion vector data.

4. The coding method according to claim 3 further comprising the step of making the number of the effective scanning lines of the second video signal being an integral number times the number of effective scanning lines of the third video signal.

* * * * *